(12) United States Patent
Roessler

(10) Patent No.: US 10,863,735 B2
(45) Date of Patent: Dec. 15, 2020

(54) CONVERTIBLE WATER AND LAND WATERFOWL DECOY

(71) Applicant: Colin Roessler, Columbia, IL (US)

(72) Inventor: Colin Roessler, Columbia, IL (US)

(*) Notice: Subject to any disclaimer, the term of this patent is extended or adjusted under 35 U.S.C. 154(b) by 513 days.

(21) Appl. No.: 15/637,880

(22) Filed: Jun. 29, 2017

(65) Prior Publication Data

US 2018/0000064 A1 Jan. 4, 2018

Related U.S. Application Data

(60) Provisional application No. 62/357,139, filed on Jun. 30, 2016.

(51) Int. Cl.
*A01M 31/06* (2006.01)
*F16M 11/00* (2006.01)

(52) U.S. Cl.
CPC ............ *A01M 31/06* (2013.01); *F16M 11/00* (2013.01)

(58) Field of Classification Search
CPC .................................................. A01M 31/06
USPC ........................................................ 43/3, 2
See application file for complete search history.

(56) References Cited

U.S. PATENT DOCUMENTS

| | | | | |
|---|---|---|---|---|
| 230,600 A * | 8/1880 | Allen | ..................... | A01M 31/06 43/3 |
| 311,877 A * | 2/1885 | Danz, Jr. | ................ | A01M 31/06 43/3 |
| 883,161 A * | 3/1908 | Rosentreter | ........... | A01M 31/06 43/3 |
| 955,203 A * | 4/1910 | Reynolds | .............. | A01M 31/06 43/3 |
| 1,392,065 A * | 9/1921 | Klock | .................... | A01M 31/06 43/3 |
| 1,571,711 A * | 2/1926 | Dewey | .................. | A01M 31/06 43/3 |
| 1,608,045 A * | 11/1926 | Stallman | ............... | A01M 31/06 43/3 |
| 1,663,009 A * | 3/1928 | Johnson | ................ | A01M 31/06 43/3 |
| 2,256,616 A * | 9/1941 | Johnson | ................ | A01M 31/06 43/3 |
| 2,268,963 A * | 1/1942 | Riddell | ................. | A01M 31/06 43/3 |
| 2,313,353 A * | 3/1943 | Mills | ..................... | A01M 31/06 43/3 |
| 2,450,572 A * | 10/1948 | Virgil | .................... | A01M 31/06 43/3 |

(Continued)

FOREIGN PATENT DOCUMENTS

| | | | | |
|---|---|---|---|---|
| GB | 431190 A * | 6/1935 | ............ | A01M 31/06 |
| GB | 587067 A * | 4/1947 | ............ | A01M 31/06 |

(Continued)

*Primary Examiner* — Darren W Ark

(57) ABSTRACT

A waterfowl decoy which can be used in water and on land. The waterfowl decoy requires no additional components to be removed or added to convert the decoy from use in water to use on land. The decoy includes stakes which rotate about axles fitted to a keel on the decoy. The stakes can be rotated or unfolded from the keel so that they point generally downward. The stakes may then be pushed into the ground to secure the decoy on land. Alternatively, if it is desired to use the decoy in the water, the stakes may be rotated or folded up into the keel where they are stored. The decoy can then be placed in the water where it can float without interference from the stakes.

6 Claims, 11 Drawing Sheets

(56) References Cited

U.S. PATENT DOCUMENTS

| | | | | | |
|---|---|---|---|---|---|
| 2,525,120 | A | * | 10/1950 | Ernst | A01M 31/06 43/3 |
| 2,535,445 | A | * | 12/1950 | Miller | A01M 31/06 43/3 |
| 2,893,154 | A | * | 7/1959 | McKee | A01M 31/06 43/3 |
| 2,952,090 | A | * | 9/1960 | Pittenger | A01M 31/06 43/3 |
| 4,334,643 | A | * | 6/1982 | Farmer | A01M 31/06 224/153 |
| 4,435,913 | A | * | 3/1984 | Messina | A01M 31/06 43/3 |
| 4,890,408 | A | * | 1/1990 | Heiges | A01M 31/06 43/3 |
| D365,136 | S | * | 12/1995 | Shaver | D22/125 |
| 6,336,286 | B1 | * | 1/2002 | Liechty, II | A01M 31/06 43/2 |
| 6,412,209 | B1 | * | 7/2002 | Kapraly | A01M 31/06 43/3 |
| 6,442,884 | B1 | * | 9/2002 | Sceery | A01M 31/06 43/2 |
| 6,543,176 | B1 | * | 4/2003 | McGhghy | A01M 31/06 43/2 |
| 7,337,575 | B2 | * | 3/2008 | Hulley | A01M 31/06 43/3 |
| 7,568,305 | B2 | * | 8/2009 | Fanfelle | A01M 31/06 43/3 |
| 8,127,487 | B2 | * | 3/2012 | Gazalski | A01M 31/06 43/3 |
| 8,136,288 | B1 | * | 3/2012 | Shope | A01M 31/06 43/2 |
| 9,078,425 | B1 | * | 7/2015 | Heiges | A01M 31/06 |
| 10,194,654 | B2 | * | 2/2019 | Hanson | A01M 31/06 |
| 10,231,448 | B2 | * | 3/2019 | Hanson | A01M 31/06 |
| 2005/0268522 | A1 | | 12/2005 | Foster et al. | |
| 2006/0283071 | A1 | * | 12/2006 | Haley | A01M 31/06 43/3 |
| 2012/0066953 | A1 | * | 3/2012 | Zink, Jr. | A01M 31/06 43/3 |

FOREIGN PATENT DOCUMENTS

| | | | | |
|---|---|---|---|---|
| GB | 920340 A | * | 3/1963 | |
| WO | WO-2008111966 A1 | * | 9/2008 | A01M 31/06 |

* cited by examiner

CONVERTIBLE WATER AND LAND WATERFOWL DECOY

CROSS-REFERENCE TO RELATED APPLICATION

This application claims the benefit of U.S. Provisional Application Ser. No. 62/357,139, filed Jun. 30, 2016 which is hereby incorporated by reference as though fully set forth herein in its entirety, including any figures, tables, and drawings.

FIELD

The disclosure relates to a waterfowl decoy to attract waterfowl such as ducks, geese, etc. and, more particularly, to a waterfowl decoy which be used on water and land.

BACKGROUND

Typical waterfowl decoys are either made for use on water or for use on land, but cannot be used on both water and land. Therefore, users of such decoys (e.g., hunters, photographers, etc.) must purchase two types of decoys—water decoys and land decoys—if they wish to attract waterfowl to both water and land. An attachable stand can be purchased for water decoys to allow for their use on land; however these are two separate components and two separate purchases which complicate the use of such decoys. Typically, when in use, multiple decoys are set or spread out to simulate natural waterfowl. Accordingly, users often own and utilize large numbers of both water decoys and land decoys. It is an object of the disclosure to eliminate the need to purchase separate water and land decoys, by providing a decoy that can be utilized in water and on land.

BRIEF SUMMARY

It is an object of the disclosure to provide a waterfowl decoy which can be used in water and on land. The waterfowl decoy requires no additional components to be removed or added to convert the decoy from use in water to use on land. The decoy includes stakes which rotate about axles fitted to a keel on the decoy. The stakes can be rotated or unfolded from the keel so that they point generally downward. One of the stakes may rotate on the left side of the keel and one will be on the right side so that the stakes do not hit each other when being rotated. The stakes may then be pushed into the ground to secure the decoy on land. Alternatively, if it is desired to use the decoy in the water, the stakes may be rotated or folded up into the keel where they are stored. The decoy can then be placed in the water where it can float without interference from the stakes. Therefore, the motion of the decoy in the water is not affected by the stakes.

Briefly therefore, one aspect of the disclosure is directed to a decoy comprising a decoy body, a keel attached to the decoy body, a first stake rotatably affixed to the keel, and a second stake rotatably affixed to the keel. The first and second stakes are adapted to be in a first position for use of the decoy on land, and are adapted to be in a second position for use of the decoy in water.

Another aspect of the disclosure is directed to a decoy comprising a decoy body, an elongate keel attached to the decoy body, the keel extending a length from a first end to a second end, and a first stake rotatably affixed to the keel. The first stake is adapted to be in a first position for use of the decoy on land, and is adapted to be in a second position for use of the decoy in water.

Yet another aspect of the disclosure is directed to a decoy comprising a decoy body, an elongate keel attached to the decoy body, the keel extending a length from a first end to a second end, and a first stake rotatably affixed to the keel and a second stake rotatably affixed to the keel. The first stake is adapted to rotate from a first position for use of the decoy on land to a second position for use of the decoy in water. When the first stake is in the first position, the first stake is perpendicular to the length of the keel, and when the first stake is in the second position, the first stake is parallel to the length of the keel. The second stake is adapted to rotate from a first position for use of the decoy on land to a second position for use of the decoy in water. When the second stake is in the first position, the second stake is perpendicular to the length of the keel, and when the second stake is in the second position, the second stake is parallel to the length of the keel.

In other aspects of the disclosure, the keel may include stake retaining elements for releasably retaining the first and second stakes in the second or stowed position.

In other aspects of the disclosure, the keel may include stake retaining elements for releasably retaining the first and second stakes in the first or un-stowed position.

BRIEF DESCRIPTION OF THE DRAWINGS

These and other aspects, features, details, utilities, and advantages of the disclosure will become more fully apparent from the following detailed description, appended claims, and accompanying drawings, wherein the drawings illustrate features in accordance with exemplary embodiments of the disclosure, and wherein:

Like reference numbers refer to like or equivalent parts in the several views.

DETAILED DESCRIPTION OF EMBODIMENTS

Figure 1:
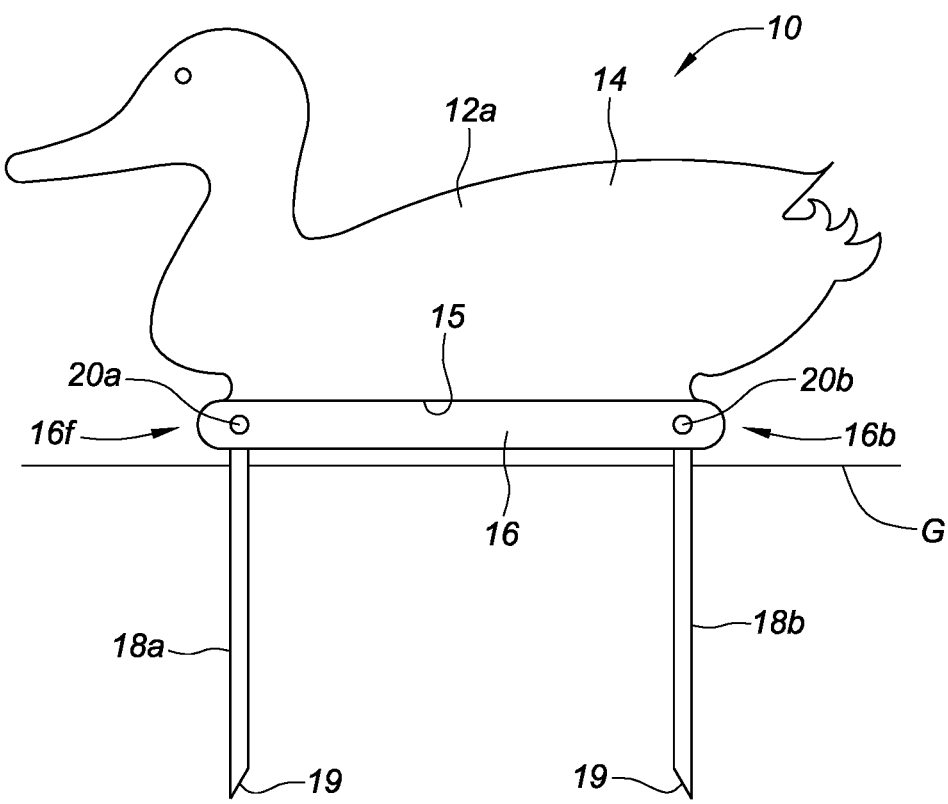
FIG. 1 is a side view of a convertible waterfowl decoy with first and second stakes in the first position according to a first embodiment of the disclosure.

Various embodiments are described herein to various apparatuses. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It must be noted that, as used in this specification and the appended claims, the singular forms "a," "an" and "the" include plural referents unless the content clearly dictates otherwise.

The terms "first," "second," and the like in the description and in the claims, if any, are used for distinguishing between similar elements and not necessarily for describing a particular sequential or chronological order. It is to be understood that the terms so used are interchangeable under appropriate circumstances such that the embodiments of the disclosure described herein are, for example, capable of operation in sequences other than those illustrated or otherwise described herein. Furthermore, the terms "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "rear," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the disclosure described herein are, for example, capable of operation in other orientations than those illustrated or otherwise described herein.

All numbers expressing measurements and so forth used in the specification and claims are to be understood as being modified in all instances by the term "about."

FIG. 1 illustrates an embodiment of the convertible waterfowl decoy 10. Decoy 10 includes a decoy body 12a having a top portion 14 and a bottom 15. Decoy body 12a may be designed to simulate the appearance of a waterfowl such as a duck or goose. Decoy body 12a is constructed so that it may float when placed in water. Decoy body 12a may be constructed from a variety of materials, including but not limited to, for example, plastic (e.g., polyethylene), wood, foam, and/or combinations of the same, as well as some other suitable material as is known in the art. Bottom 15 of decoy body 12a is generally flat.

A keel 16 is attached to bottom 15 of decoy body 12a. Keel 16 provides stability to decoy body 12a, so that when decoy 10 is placed in the water, decoy 10 does not capsize. Keel 16 is elongate and generally rectangular in cross section, having a length from its front or first end 16f to its back or second end 16b. Keel 16 runs parallel to the length of decoy body 12a (from head to tail). For example only and without limitation, keel 16 may generally be about 25.4 cm long by about 2.54 cm wide by about 2.54 cm tall (about ten (10) inches long by about one (1) inch wide by about one (1) inch tall). It will be understood however that keel 16 may have different dimensions without departing from the scope of the disclosure. Keel 16 may be hollow or include one or more hollow sections (not shown) as is known in the art. The hollow sections may be externally accessible via a port with a cap and may be filled with various weighting substances such as lead shot, sand, or water. Keel 16 may be constructed from a variety of materials, including but not limited to, for example, plastic (e.g., polyethylene), wood, foam, and/or combinations of the same. In some embodiments, for example, keel 16 may be molded of plastic such as polyethylene or some other suitable material as is known in the art.

Keel 16 includes a first stake 18a and a second stake 18b which are both rotatably affixed to keel 16. That is, first stake 18a is rotatable on a first axle 20a located proximate the front or first end of keel 16f and the second stake 18b is rotatable on a second axle 20b located proximate the back or second end of keel 16b. Axles 20a, 20b may be axles extending through stakes 18a, 18b. Axles 20a, 20b each have an axis A (see FIG. 3) which is perpendicular or substantially perpendicular to the length of the keel 16. The axes of axles 20*a*, 20*b* are also oriented horizontally. Therefore, first and second stakes 18*a*, 18*b* can be rotated between a first (downward or unfolded) position and a second (stowed or folded) position (see FIG. 2) depending on whether the user wishes to place decoy 10 on land or in water. The first and second axles 20*a*, 20*b* may be located above the bottom of keel 16 so that when first and second stakes 18*a*, 18*b* are in the second position they stay above the bottom of keel 16. That is, first and second stakes 18*a*, 18*b* are recessed in keel 16 in the second position. For example only and without limitation, the centers of axles 20*a*, 20*b* may be about 0.925 cm (about three-eighths (⅜) of an inch) from the bottom of keel 16. Additionally, for example only and without limitation, the centers of first and second axles 20*a*, 20*b* may be about 0.635 cm (about one quarter (¼) of an inch) inside keel 16. This may reduce or prevent first and second stakes 18*a*, 18*b* from becoming hung up on decoy bags in which decoy 10 may be stored and/or on any decoy line which may be attached to decoy 10. In various embodiments, keel 16 may be molded to decoy body 12*a* so that decoy 10 does not need to be assembled by the user. In some embodiments, first and second stakes 18*a*, 18*b* may be affixed to decoy 10 by the user or decoy 10 may be assembled and/or sold with first and second stakes 18*a*, 18*b* affixed to decoy 10.

As shown in FIG. 1, first and second stakes 18*a*, 18*b* may be located in a first or un-stowed position when it is desired to use decoy 10 on land (represented by ground line G). First and second stakes 18*a*, 18*b* are oriented such that they generally point downward away from bottom 16 of decoy body 12*a*. Thus in various embodiments, first and second stakes 18*a*, 18*b* may be substantially perpendicular to the length of keel 16. The user may then stick first and second stakes 18*a*, 18*b* into the ground (represented by ground line G). Stakes prevent decoy 10 from falling over to either side and allow secure placement of decoy 10 on land. Stakes 18*a*, 18*b* may include a pointed end 19 (e.g., conical point, chamfered point, etc.) to make pushing stakes 18*a*, 18*b* into hard ground easier and more time efficient. First and second stakes 18*a*, 18*b* may be constructed of a variety of materials, including but not limited to, metals, plastics, and composites. If stakes 18*a*, 18*b* are made of metal a rust-resistant metal (e.g., stainless steel, aluminum, etc.) or coating (e.g., galvanized, rubber, plastic, etc.) may be desired to prevent corrosion of stakes 18*a*, 18*b*. In various embodiments, stakes 18*a*, 18*b* may be fiberglass or glass reinforced plastic.

Figure 2:
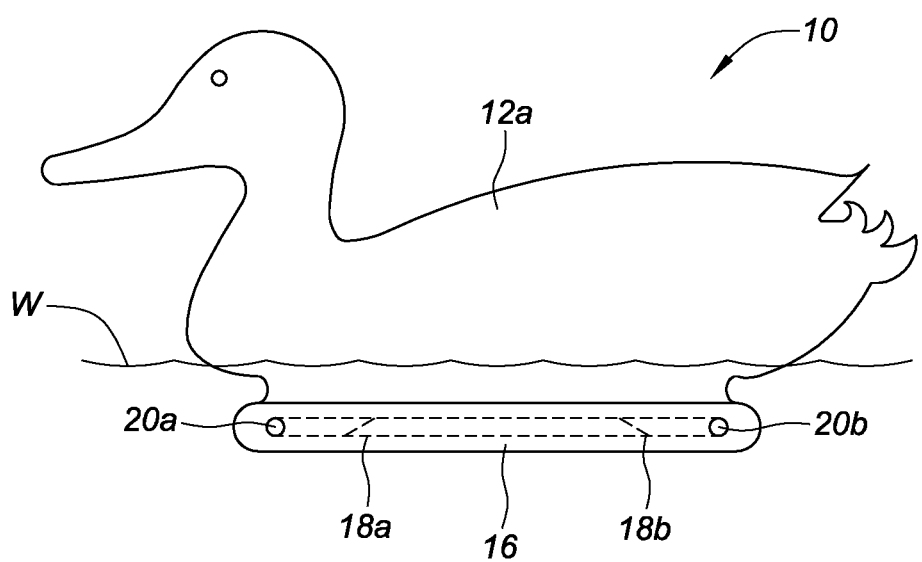
FIG. 2 is a side view of a convertible waterfowl decoy with first and second stakes in the second position according to the first embodiment of the disclosure.

When it is desired to use decoy 10 in the water (represented by water line W), the user simply rotates or folds stakes 18*a*, 18*b* up into keel 16. FIG. 2 illustrates first and second stakes 18*a*, 18*b* in the second or stowed position. In the second position, first and second stakes 18*a*, 18*b* are substantially parallel to the length of keel 16. By rotating first and second stakes 18*a*, 18*b* so that they are stowed into keel 16, decoy 10 may freely float in the water. Decoy 10 is shown floating in water with keel 16 below the water line W.

Figure 3:
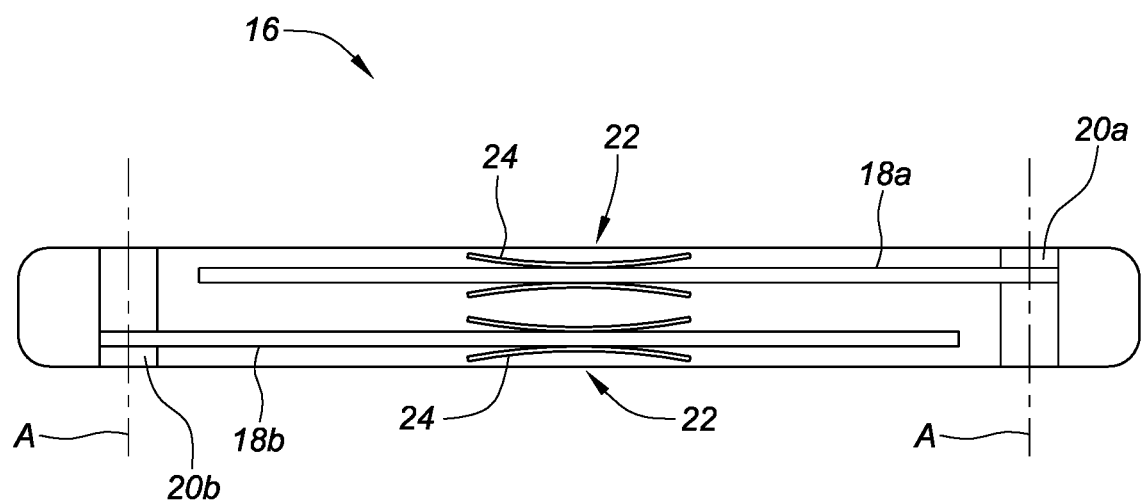
FIG. 3 is a bottom view of a keel of a convertible waterfowl decoy with first and second stakes in the second position according to the first embodiment of the disclosure.

With reference now to FIG. 3, a bottom view of keel 16 is shown. Keel 16 may further include stake retaining elements 22 for releasably retaining first and second stakes 18*a*, 18*b* in the second or stowed position. Thus, stake retaining elements 22 may keep stakes 18*a*, 18*b* folded up until the user wishes to use decoy 10 on land. In various embodiments, for example, a stake retaining element 22 may comprise a pair of clamp members 24 which are leaf-spring shaped and which are normally tensioned toward one another. When stakes 18*a*, 18*b* are folded into the second position, stakes 18*a*, 18*b* push apart clamp members 24. The spring force from clamp members 24 pushes against stakes 18*a*, 18*b* from each side of the stakes 18*a*, 18*b*, thereby retaining stakes 18*a*, 18*b* in stake retaining elements 22 and in the second or stowed position. Stake retaining elements 22 may be constructed of a variety of materials, including but not limited to, metals, plastics, and composites. If stake retaining elements 22 are made of metal a rust-resistant metal (e.g., stainless steel, aluminum, etc.) or coating (e.g., galvanized, rubber, plastic, etc.) may be desired to prevent corrosion of stake retaining elements 22. In various embodiments, stake retaining elements 22 may be fiberglass or glass reinforced plastic. As shown, for example, in various embodiments, stake retaining elements 22 may be centrally located along the length of keel 16. In other embodiments, however, stake retaining elements 22 may be located at any point along the length of keel 16.

Figure 4:
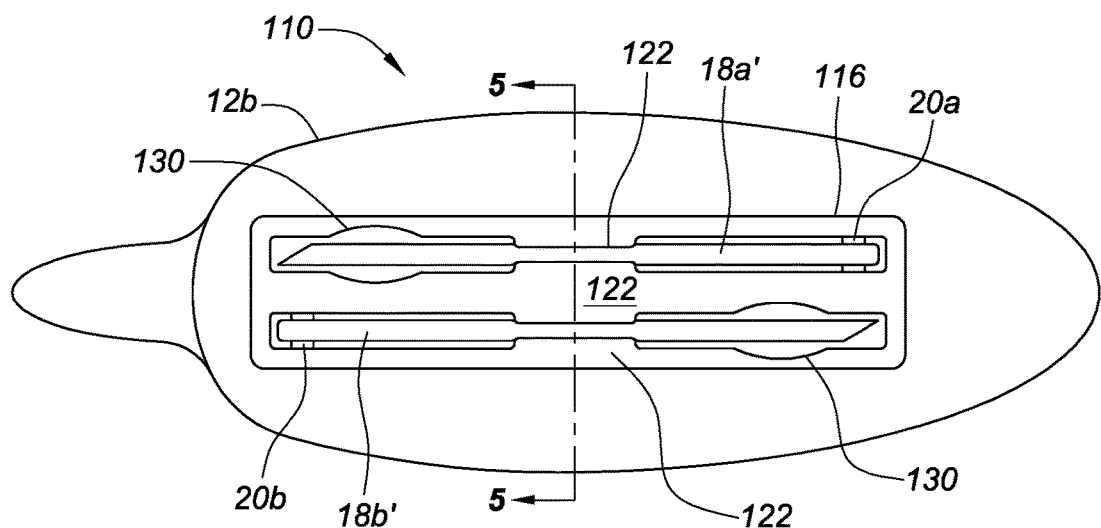
FIG. 4 is a bottom view of a convertible waterfowl decoy with first and second stakes in the second position and according to a second embodiment of the disclosure.
Figure 5:
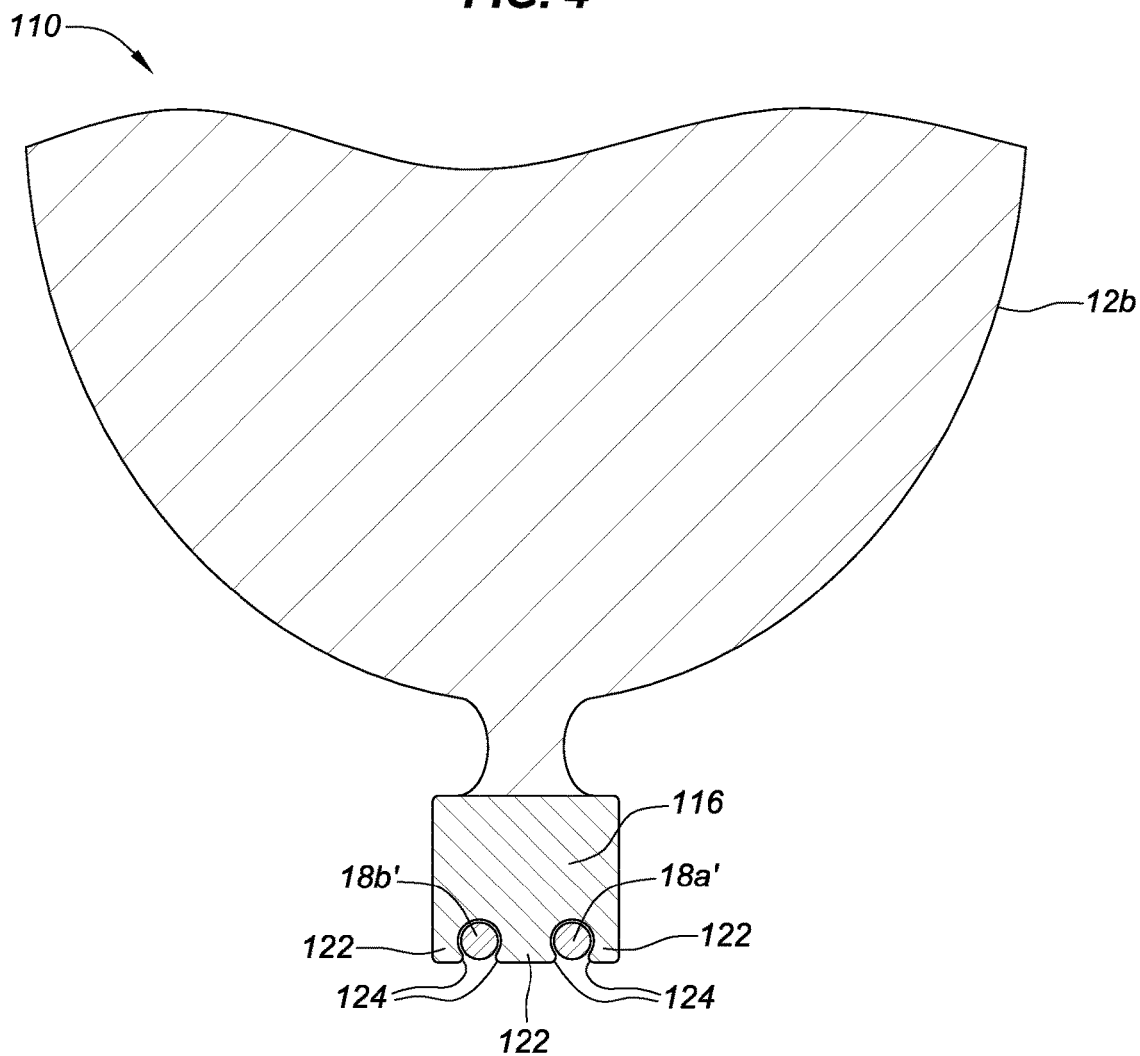
FIG. 5 is a cross-sectional view of the convertible waterfowl decoy of FIG. 4, taken along line 5-5 in FIG. 4.

Another embodiment of decoy 110 of the disclosure is illustrated in FIGS. 4, 5 and is described below. Some features of one or more of decoys 10 and 110, including keels 16 and 116, are common to one another and, accordingly, descriptions of such features in one embodiment should be understood to apply to other embodiments. Furthermore, particular characteristics and aspects of one embodiment may be used in combination with, or instead of, particular characteristics and aspects of another embodiment.

Decoy 110 comprises a decoy body 12*b*, a keel 116 attached to the decoy body 12*b*, a first stake 18*a*' rotatably affixed to the keel 116, and a second stake 18*b*' rotatably affixed to the keel. As described above, the first and second stakes 18*a*', 18*b*' are adapted to be in a first position for use of the decoy 110 on land, and are adapted to be in a second position for use of the decoy 110 in water.

As shown in FIGS. 4 and 5, decoy 110 further includes one or more stake retaining elements 122 which may be integrally molded with keel 116. That is, stake retaining elements 122 may be molded from the same material as keel 116, such as, for example, polyethylene. In such case, one or more stake retaining elements 122 may be sufficiently flexible to permit movement when stakes 18*a*', 18*b*' are placed in the second or stowed position and sufficiently rigid to retain stakes 18*a*', 18*b*' in the second or stowed position. That is, stakes 18*a*', 18*b*' may snap into one or more stake retaining elements 122. Stake retaining elements 122 may further include protrusions 124 which assist in retaining stakes 18*a*', 18*b*' in the second or stowed position. Additionally, as shown in FIG. 4, keel 116 may include recessed areas 130 into which a user may insert their fingers or some other object to grasp stakes 18*a*', 18*b*'. Recessed areas 130 may more easily permit a user to pull stakes 18*a*', 18*b*' out of keel 116 and rotate stakes 18*a*', 18*b*' to the first or un-stowed position.

Figure 6:
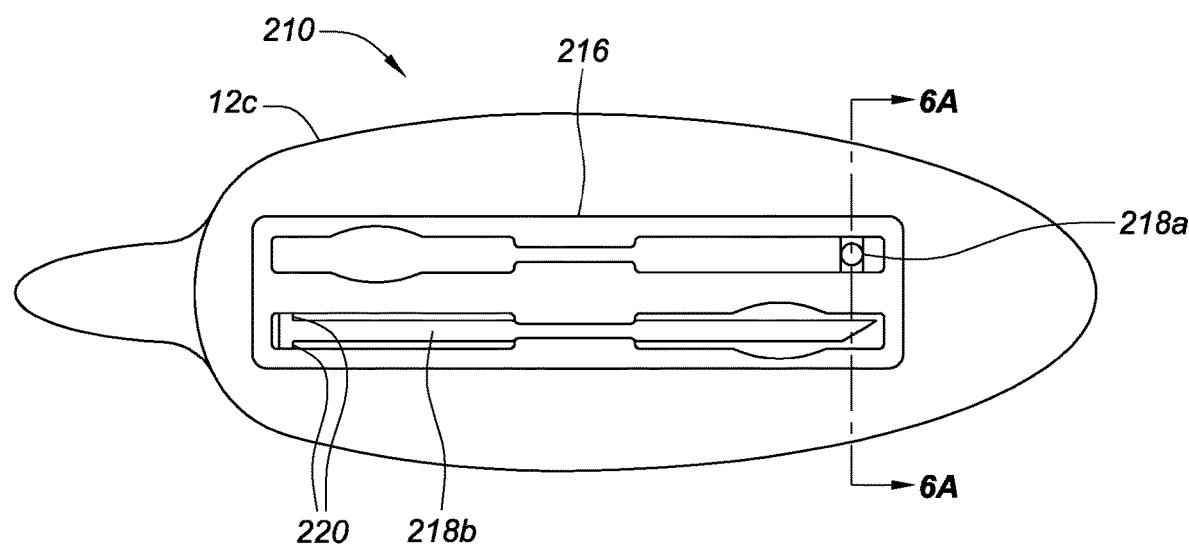
FIG. 6 is a bottom view of a convertible waterfowl decoy with a first stake in the first position and the second stake in the second position and according to a third embodiment of the disclosure.
Figure 6A:
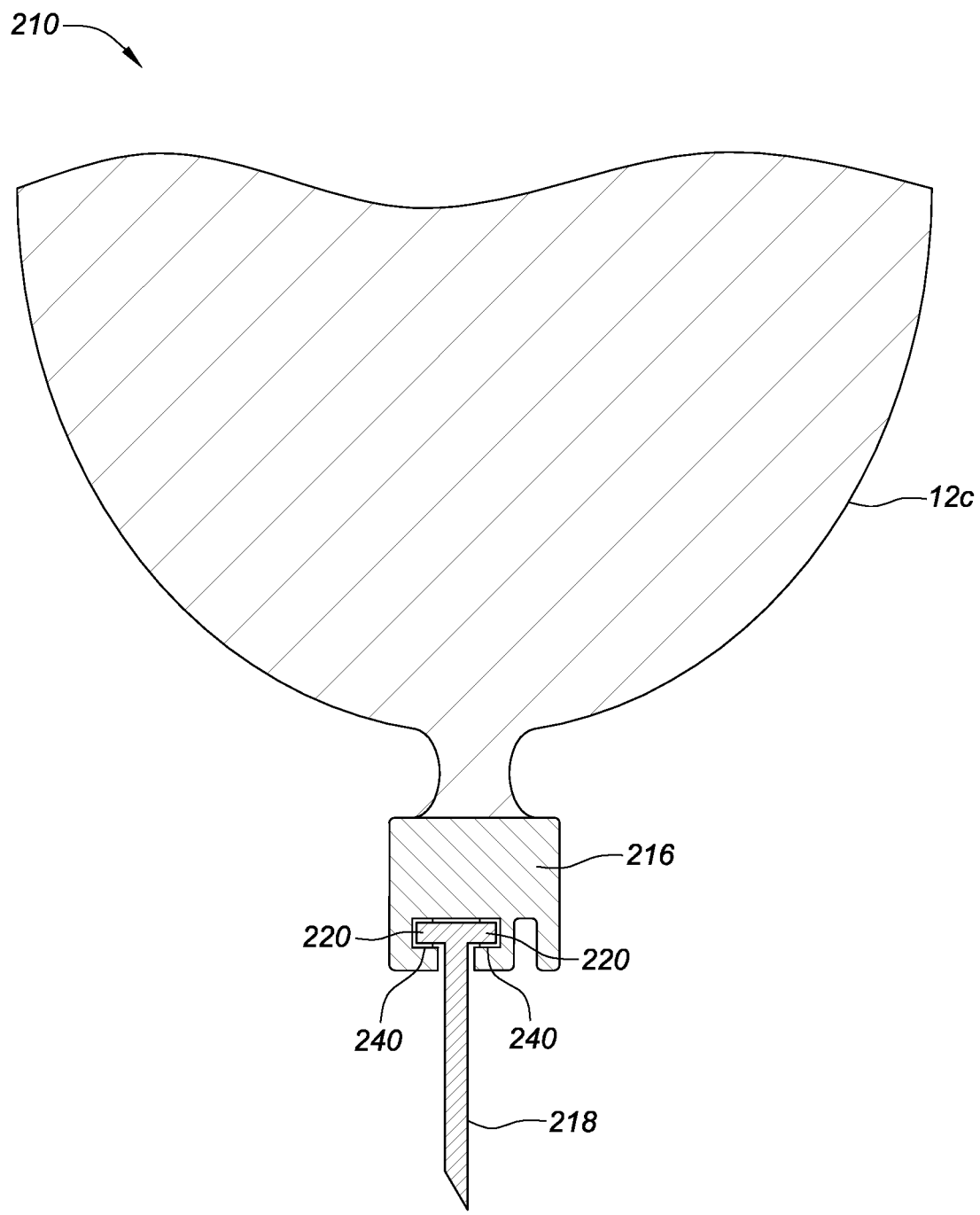
FIG. 6A is a cross-sectional view of the convertible waterfowl decoy of FIG. 6, taken along line 6A-6A in FIG. 6.

Another embodiment of decoy 210 of the disclosure is illustrated in FIGS. 6 and 6A and is described below. Some features of one or more of decoys 10, 110, and 210, including stakes 18*a*, 18*b* and 218*a*, 218*b*, are common to one another and, accordingly, descriptions of such features in one embodiment should be understood to apply to other embodiments. Furthermore, particular characteristics and aspects of one embodiment may be used in combination with, or instead of, particular characteristics and aspects of another embodiment.

Decoy 210 comprises a decoy body 12*c*, a keel 216 attached to the decoy body 12*c*, a first stake 218*a* rotatably affixed to the keel 216, and a second stake 218*b* rotatably affixed to the keel 216. As described above, the first and second stakes 218*a*, 218*b* are adapted to be in a first position for use of the decoy 210 on land, and are adapted to be in a second position for use of the decoy 210 in water.

As shown in FIGS. 6 and 6A, axles 220 extend from stakes 218a, 218b and are inserted into corresponding holes 240 within keel 216. Axles 220 may be integrally formed with stakes 218a, 218b or affixed to stakes 218a, 218b. In this embodiment, axles 220 rotate with respect to keel 216 and are fixed with respect to stakes 218a, 218b, such that the axles 220 of each stake 218a, 218b do not rotate with respect to their respective stake 218a or 218b. Therefore, the rotation of each axle 220 is coincident and coextensive with the rotation of the stake 218a or 218b to which each axle 220 is affixed. Stake 218a is shown in first (downward or unfolded) position and stake 218b is shown in the second (stowed or folded) position.

Figure 7:
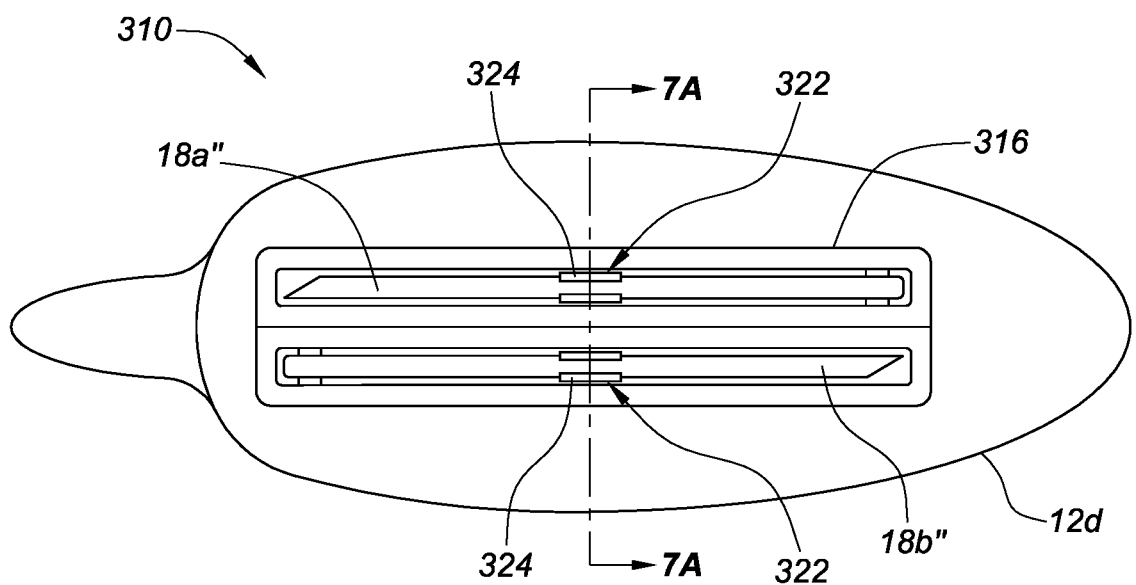
FIG. 7 is a bottom view of a convertible waterfowl decoy with first and second stakes in the second position and according to a fourth embodiment of the disclosure.
Figure 7A:
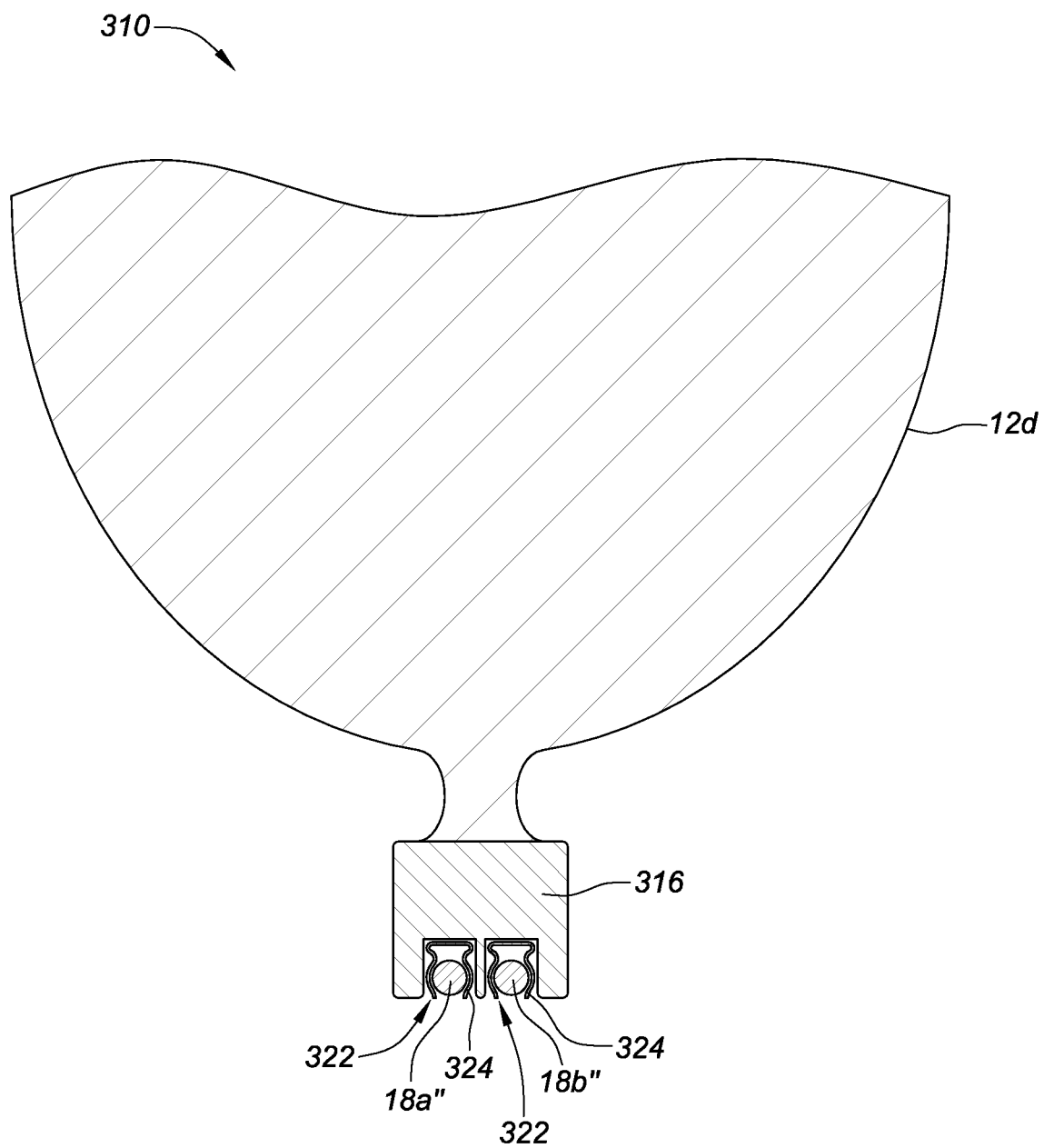
FIG. 7A is a cross-sectional view of the convertible waterfowl decoy of FIG. 7, taken along line 7A-7A in FIG. 7.

Another embodiment of decoy 310 of the disclosure is illustrated in FIGS. 7 and 7A and is described below. Some features of one or more of decoys 10, 110, 210, and 310, are common to one another and, accordingly, descriptions of such features in one embodiment should be understood to apply to other embodiments. Furthermore, particular characteristics and aspects of one embodiment may be used in combination with, or instead of, particular characteristics and aspects of another embodiment.

Decoy 310 comprises a decoy body 12d, a keel 316 attached to the decoy body 12d, a first stake 18a" rotatably affixed to the keel 316, and a second stake 18b" rotatably affixed to the keel 316. As described above, the first and second stakes 18a", 18b" are adapted to be in a first position for use of the decoy 310 on land, and are adapted to be in a second position for use of the decoy 310 in water.

As shown in FIGS. 7 and 7A, one or more stake retaining elements 322 for releasably retaining first and second stakes 18a", 18b" in the second or stowed position may be affixed to or housed within keel 316. Thus, stake retaining elements 322 may keep stakes 18a", 18b" folded up until the user wishes to use decoy 310 on land. In various embodiments, for example, a stake retaining element 322 may comprise a spring clamp 324 which includes two semi-circular fingers which are normally tensioned toward one another. When stakes 18a", 18b" are folded into the second position, stakes 18a", 18b" push apart the two semi-circular fingers of the spring clamps 324. The spring force from spring clamps 324 pushes against stakes 18a", 18b" from each side of the stakes 18a", 18b", thereby retaining stakes 18a", 18b" between the two semi-circular fingers of the spring clamps 324 and in the second or stowed position. Stake retaining elements 322 may be constructed of a variety of materials, including but not limited to, metals, plastics, and composites. If stake retaining elements 322 are made of metal a rust-resistant metal (e.g., stainless steel, aluminum, etc.) or coating (e.g., galvanized, rubber, plastic, etc.) may be desired to prevent corrosion of stake retaining elements 322. As shown, for example, in various embodiments, stake retaining elements 322 may be centrally located along the length of keel 316. In other embodiments, however, stake retaining elements 322 may be located at any point along the length of keel 316.

Figure 8:
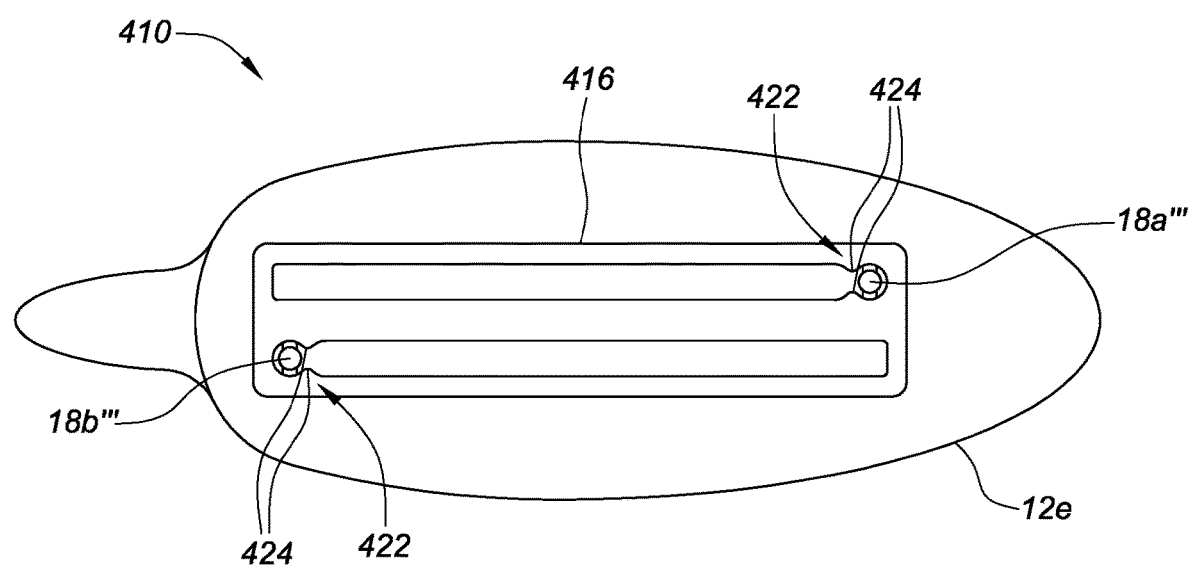
FIG. 8 is a bottom view of a convertible waterfowl decoy with first and second stakes in the first position and according to a fifth embodiment of the disclosure.

Another embodiment of decoy 410 of the disclosure is illustrated in FIG. 8 and is described below. Some features of one or more of decoys 10, 110, 210, 310, and 410, including keels 16, 116, 216, 316 and 416, are common to one another and, accordingly, descriptions of such features in one embodiment should be understood to apply to other embodiments. Furthermore, particular characteristics and aspects of one embodiment may be used in combination with, or instead of, particular characteristics and aspects of another embodiment.

Decoy 410 comprises a decoy body 12e, a keel 416 attached to the decoy body 12e, a first stake 18a''' rotatably affixed to the keel 416, and a second stake 18b''' rotatably affixed to the keel 416. As described above, the first and second stakes 18a''', 18b''' are adapted to be in a first position for use of the decoy 410 on land, and are adapted to be in a second position for use of the decoy 410 in water.

As shown in FIG. 8, keel 416 may include one or more stake retaining elements 422 which may aid in keeping stakes 18a''', 18b''' in the first position so that stakes 18a''', 18b''' do not move from the first position when stakes 18a''', 18b''' are inserted into the ground. In various embodiments, for example only and without limitation, stake retaining elements 422 may be integrally molded with keel 416. That is, stake retaining elements 422 may be molded from the same material as keel 416, such as, for example, polyethylene. In such case, one or more stake retaining elements 422 may be sufficiently flexible to permit movement when stakes 18a''', 18b''' are placed in the first or un-stowed position and sufficiently rigid to retain stakes 18a''', 18b''' in the first position. That is, stakes 18a''', 18b''' may snap into one or more stake retaining elements 422 when placed in the first position. Stake retaining elements 422 may further include protrusions 424 which assist in retaining stakes 18a''', 18b''' in the first position. When user wishes to place stakes 18a''', 18b''' in the second position, the user can gently rotate stakes 18a''', 18b''' so that they unsnap from stake retaining elements 422.

It will be understood by one in the art that stake retaining elements 422 may also be included on a keel which also includes stake retaining elements 22, 122, and/or 322. In other embodiments, for example only and without limitation, stake retaining elements 422 may be may be constructed of a variety of materials, including but not limited to, metals, plastics, and composites. If stake retaining elements 422 are made of metal a rust-resistant metal (e.g., stainless steel, aluminum, etc.) or coating (e.g., galvanized, rubber, plastic, etc.) may be desired to prevent corrosion of stake retaining elements 422.

In yet other embodiments, stake retaining elements 422 may comprise a pair of clamp members similar to clamp members 24 (see FIG. 3) which are leaf-spring shaped and which are normally tensioned toward one another. When stakes 18a''', 18b''' are folded into the first position, stakes 18a''', 18b''' push apart the clamp members. The spring force from the clamp members pushes against stakes 18a''', 18b''' from each side of the stakes 18a''', 18b''', thereby retaining stakes 18a''', 18b''' in stake retaining elements 422 and in the first or un-stowed position. In yet other embodiments, stake retaining elements 422 may comprise a spring clamp similar to spring claim 324 (see FIGS. 7 and 7A) which includes two semi-circular fingers which are normally tensioned toward one another. When stakes 18a''', 18b''' are folded into the second position, stakes 18a''', 18b''' push apart the two semi-circular fingers of the spring clamps. The spring force from spring clamps pushes against stakes 18a''', 18b''' from each side of the stakes 18a''', 18b''', thereby retaining stakes 18a''', 18b''' between the two semi-circular fingers of the spring clamps and in the second or stowed position.

Figure 9:
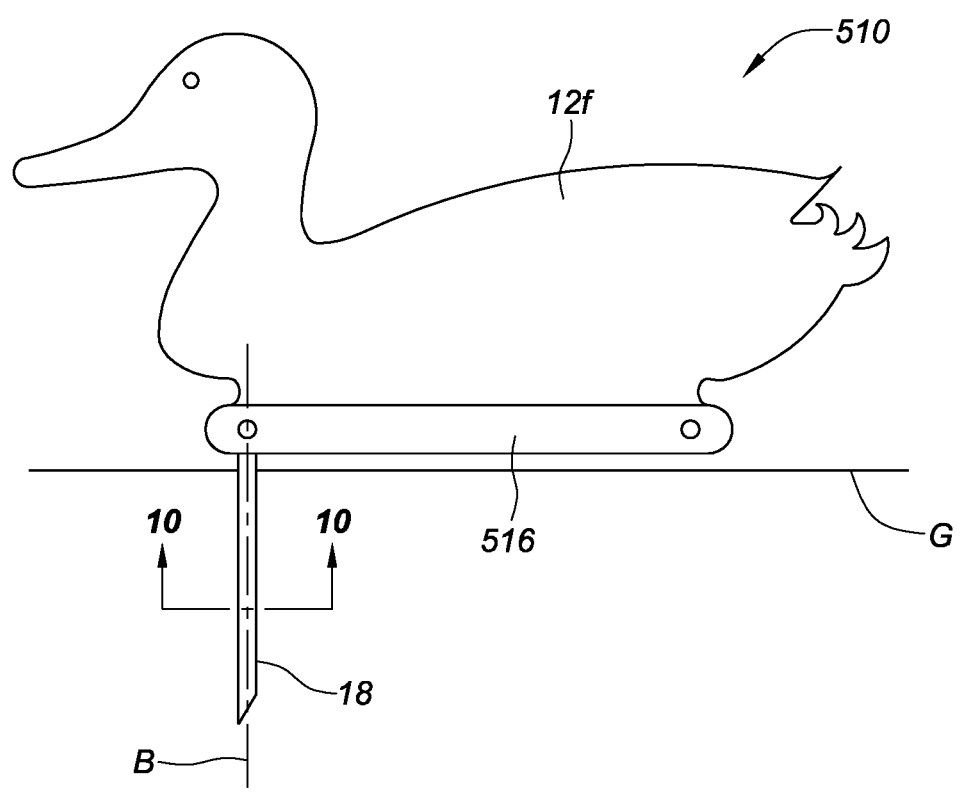
FIG. 9 is a side view of a convertible waterfowl decoy with a single stake in the first position according to a sixth embodiment of the disclosure.

Another embodiment of decoy 510 of the disclosure is illustrated in FIG. 9 and is described below. Some features of one or more of decoys 10, 110, 210, 310, and 410 are common to one another and, accordingly, descriptions of such features in one embodiment should be understood to apply to other embodiments. Furthermore, particular characteristics and aspects of one embodiment may be used in combination with, or instead of, particular characteristics and aspects of another embodiment.

As shown in FIG. 9, decoy 510 comprises a decoy body 12f, a keel 516 attached to the decoy body 12f, a single stake 18 rotatably affixed to the keel 516. Thus, decoy 510 only has a single stake 18. As described above, the stake 18 is adapted to be in a first position for use of the decoy 510 on land, and is adapted to be in a second position for use of the decoy 510 in water. Decoy 510 may include stake retaining elements for releasably retaining stake 18 in the first position and/or stake retaining elements for releasably retaining stake 18 in the second position, as described in greater detail elsewhere herein. With further reference to FIG. 9, stake 18 has a stake axis B along the length of stake 18.

Figure 10:
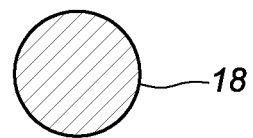
FIG. 10 is a cross-sectional view of the stake of FIG. 9, taken along line 9-9 in FIG. 9.
Figure 11:
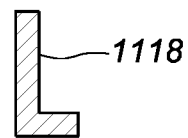
FIG. 11 is similar to FIG. 9, but is a cross-sectional view of a stake according to a seventh embodiment of the disclosure.
Figure 12:
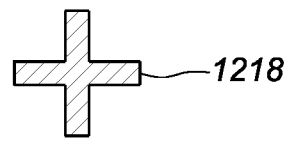
FIG. 12 is similar to FIG. 9, but is a cross-sectional view of a stake according to an eighth embodiment of the disclosure.
Figure 13:
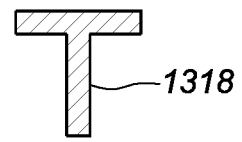
FIG. 13 is similar to FIG. 9, but is a cross-sectional view of a stake according to a ninth embodiment of the disclosure.
Figure 14:
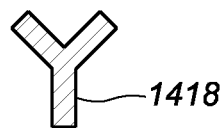
FIG. 14 is similar to FIG. 9, but is a cross-sectional view of a stake according to a tenth embodiment of the disclosure.
Figure 15:
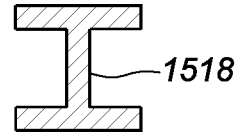
FIG. 15 is similar to FIG. 9, but is a cross-sectional view of a stake according to an eleventh embodiment of the disclosure.
Figure 16:
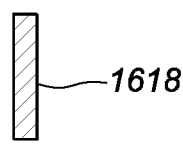
FIG. 16 is similar to FIG. 9, but is a cross-sectional view of a stake according to a twelfth embodiment of the disclosure.

Now with reference to FIGS. 10-16, various embodiments of the cross-sectional shapes of the stakes which may be used in the embodiments of decoys described herein are illustrated. FIG. 10 depicts stake 18 having a circular shaped cross-section. FIG. 11 depicts stake 1118 having an L-shaped cross-section. FIG. 12 depicts stake 1218 having an X- or plus-sign-shaped cross-section. FIG. 13 depicts stake 1318 having a T-shaped cross-section. FIG. 14 depicts stake 1418 having a Y-shaped cross-section. FIG. 15 depicts stake 1518 having an I-shaped cross-section. FIG. 16 depicts stake 1618 having a rectangular shaped cross-section. It will be understood that the stakes described herein may have any shape (e.g., oval shape, diamond shape, parallelogram shape, triangular shape, U-shape, etc.) and is not limited to the shapes shown and described herein. The cross-sectional shapes of stakes shown in FIGS. 11-16 may substantially reduce or eliminate the ability of the stakes to rotate about the stake axis (see axis B in FIG. 9).

Figure 17:
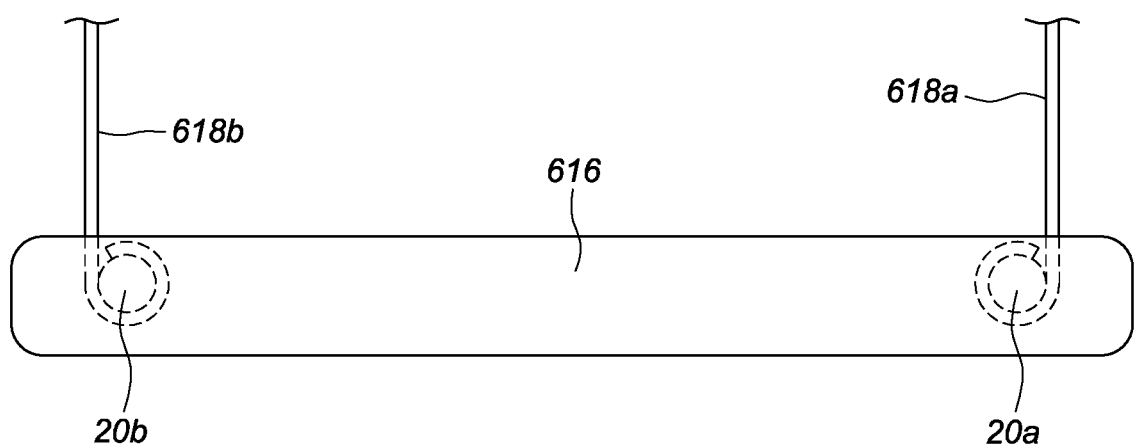
FIG. 17 is a side view of a keel of a convertible waterfowl decoy according to a thirteenth embodiment of the disclosure.

Another embodiment of keel 616 of the disclosure is illustrated in FIG. 17 and is described below. Some features of one or more of keels 16, 116, 216, 316, 416, and 516, are common to one another and, accordingly, descriptions of such features in one embodiment should be understood to apply to other embodiments. Furthermore, particular characteristics and aspects of one embodiment may be used in combination with, or instead of, particular characteristics and aspects of another embodiment.

FIG. 17 illustrates a side view of keel 616 wherein first and second stakes 618a, 618b are rotatably affixed to first and second axles 20a, 20b, respectively, by being wrapped around first and second axles 20a, 20b. That is, first and second stakes 618a, 618b may be, for example only and without limitation, made from a heavy gauge wire or a rod material which has been bent to make at least a partial loop around first and second axles 20a, 20b. The loop of the first and second stakes 618a, 618b retains first and second stakes 618a, 618b on first and second axles 20a, 20b, respectively.

In closing, it should be noted that the disclosure is not limited to the above mentioned embodiments and exemplary working examples. Further developments, modifications and combinations are also within the scope of the patent claims and are placed in the possession of the person skilled in the art from the above disclosure. Accordingly, the techniques and structures described and illustrated herein should be understood to be illustrative and exemplary, and not limiting upon the scope of the present disclosure. The scope of the present disclosure is defined by the appended claims, including known equivalents and unforeseeable equivalents at the time of filing of this application.

What is claimed is:

1. A decoy comprising:
   a floatable decoy body;
   an elongate stabilizing keel attached to the floatable decoy body, the keel extending a length from a first end to a second end and having a first recess and a second recess;
   a first stake rotatably affixed to the keel, wherein the first stake is adapted to rotate from a first position for use of the decoy on land to a second position for use of the decoy in water; wherein when the first stake is in the first position, the first stake is insertable into the ground, and when the first stake is in the second position, the first stake is recessed into the first recess in the keel; and
   a second stake rotatably affixed to the keel, wherein the second stake is adapted to rotate from a first position for use of the decoy on land to a second position for use of the decoy in water; wherein when the second stake is in the first position, the second stake is insertable into the ground, and when the second stake is in the second position, the second stake is recessed into the second recess in the keel.

2. The decoy of claim 1, wherein the keel is adapted to releasably retain the first and second stakes in the second position.

3. The decoy of claim 1, wherein the keel is adapted to releasably retain the first and second stakes in the first position.

4. The decoy of claim 1, wherein the decoy further comprises one or more stake retaining elements for releasably retaining the first and second stakes in the second position.

5. The decoy of claim 4, wherein the one or more stake retaining elements are integrally formed with the keel.

6. The decoy of claim 4, wherein the one or more stake retaining elements comprise spring clamps.

* * * * *